United States Patent [19]
Fuller

[11] Patent Number: 4,880,075
[45] Date of Patent: Nov. 14, 1989

[54] ANTI-LOCK HYDRAULIC MODULATOR UNITS FOR VEHICLES

[75] Inventor: Robert G. Fuller, Coventry, England
[73] Assignee: Lucas Industries Public Limited Company, England
[21] Appl. No.: 155,893
[22] Filed: Feb. 16, 1988
[51] Int. Cl.[4] .................................................. B60T 8/34
[52] U.S. Cl. ................................. 180/219; 188/181 A; 188/218 A; 188/344; 280/703
[58] Field of Search ............... 188/181 A, 181 R, 344, 188/218 A; 180/219; 280/703

[56] References Cited
U.S. PATENT DOCUMENTS

| | | | |
|---|---|---|---|
| 4,225,020 | 9/1980 | Blomberg | 188/181 R |
| 4,694,938 | 9/1987 | Hayashi et al. | 188/181 A |
| 4,733,757 | 3/1988 | Hayashi et al. | 188/181 A |
| 4,745,994 | 5/1988 | Tsuchida | 188/181 A |
| 4,760,899 | 8/1988 | Hayashi et al. | 188/181 A |
| 4,770,473 | 9/1988 | Tsuchida | 188/181 A X |

*Primary Examiner*—Mitchell J. Hill
*Attorney, Agent, or Firm*—Laff, Whitesell, Conte & Saret

[57] ABSTRACT

An anti-lock modulator unit is mounted adjacent to a front wheel fork of a motor cycle by a mounting plate which is secured to the axle. A drive pinion for the unit may be driven either directly, or through a belt drive, from a pinion which, in turn, is driven from the hub of the wheel, with the pinions located within a sealing recess between the plate and the casing.

9 Claims, 3 Drawing Sheets

ANTI-LOCK HYDRAULIC MODULATOR UNITS FOR VEHICLES

This invention relates to anti-lock hydraulic modulator units for vehicles of the kind for modulating the supply of hydraulic fluid from a master cylinder to a wheel brake and comprising a housing incorporating a wheel angular speed sensor of the inertia type, a dump valve, and a hydraulic pump for re-applying the brake automatically during a given brake-applying cycle after the brake pressure has first been relieved by operation of the dump valve by the sensor. More particularly the present invention is concerned with improved means for installing a modulator unit of the kind set forth in a motor cycle adjacent to a wheel from which the unit is adapted to be driven.

It is known from GB-A-2160602 to install an hydraulic modulator unit of the kind set forth in a motor cycle with the unit driven from the front wheel. In one of the installations described the wheel hub is modified to include an axially extending radial wall defining a recess which is closed by an annular rim extending axially from a panel fixed to the axle, and the panel forms a mounting for the modulator unit. The modulator unit is driven from the wheel through a belt drive from pulley which is rotatable on a bearing mounted on a central boss, with the pulley, in turn, being driven from the wheel through a dog joint.

A specially constructed wheel must be provided for the installation disclosed in GB-A-2160602. In addition difficulty would be experienced in providing an effective seal between the rotating radial wall and the relatively stationary rim in order to prevent the recess from filling with dirt and other material which might affect operation of the drive to the unit.

According to our invention an anti-lock modulator unit is carried by a plate which is adapted to be mounted on one end of a non-rotatable axle upon which a wheel having a hub is journalled for rotation, and a casing extending axially and radially inwards from the outer peripheral edge of the plate is adapted to seal at its inner edge against the external surface of the hub of the wheel.

A recess defined by the interior of the casing and the plate is therefore effectively sealed from the ingress of dirt and other material to provide a convenient space in which transmission means for the unit can be installed in a fully protected manner.

Preferably the plate has an axially extending boss which is adapted to encircle the axle and provides a mounting for a drive pinion provided with drive means for co-operation with complementary drive means on the hub.

Thus to install the unit in a motor cycle the wheel hub requires a small modification to provide it with the drive means and a face for sealing engagement by the seal.

Conveniently the drive pinion is rotatable on a bearing mounted on the boss, and may drive the modulator unit, either through a belt drive co-operating with a driven pinion on a drive shaft for the unit, or by the direct co-operation by the two drive and driven pinions in an installation in which the diameter of the drive pinion is increased substantially.

Two embodiments of our invention are illustrated in the accompanying drawings in which.

Figure 1:
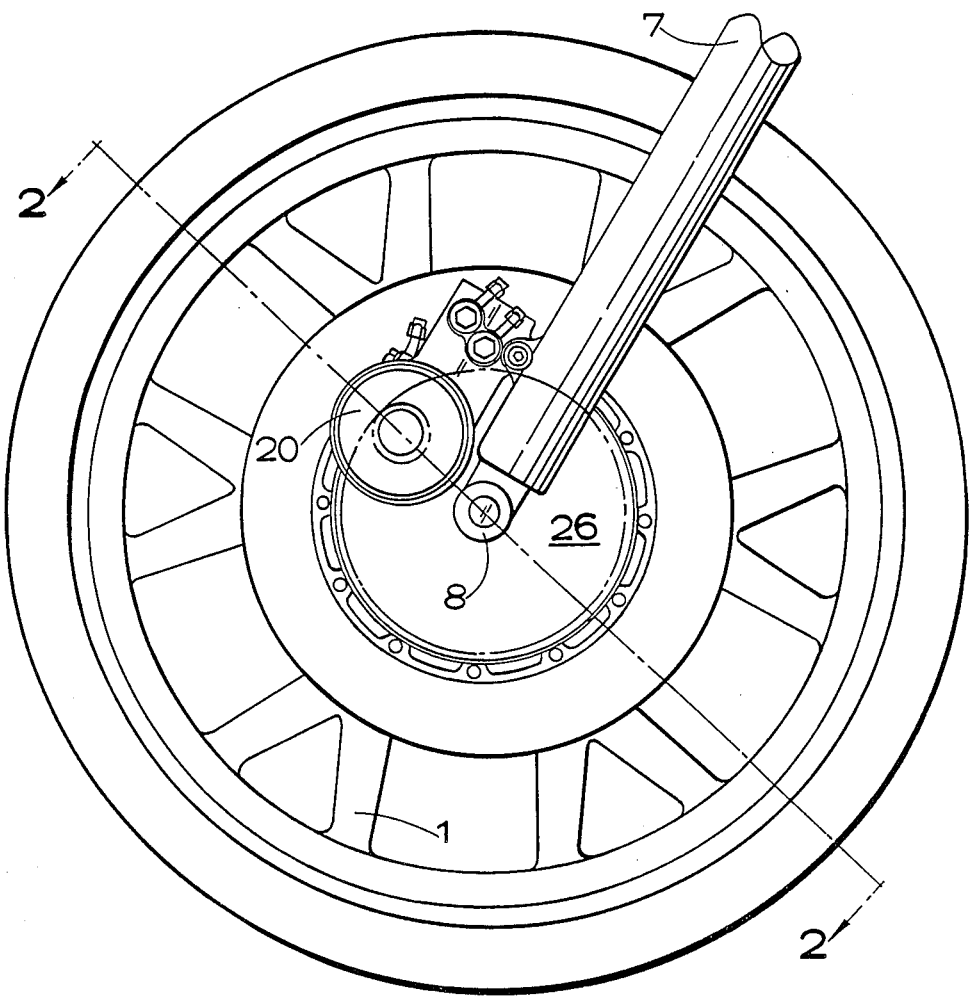
FIG. 1 is a side elevation of a front wheel of a motor cycle including the lower end of the forks and showing an anti-lock modulator unit.
Figure 2:
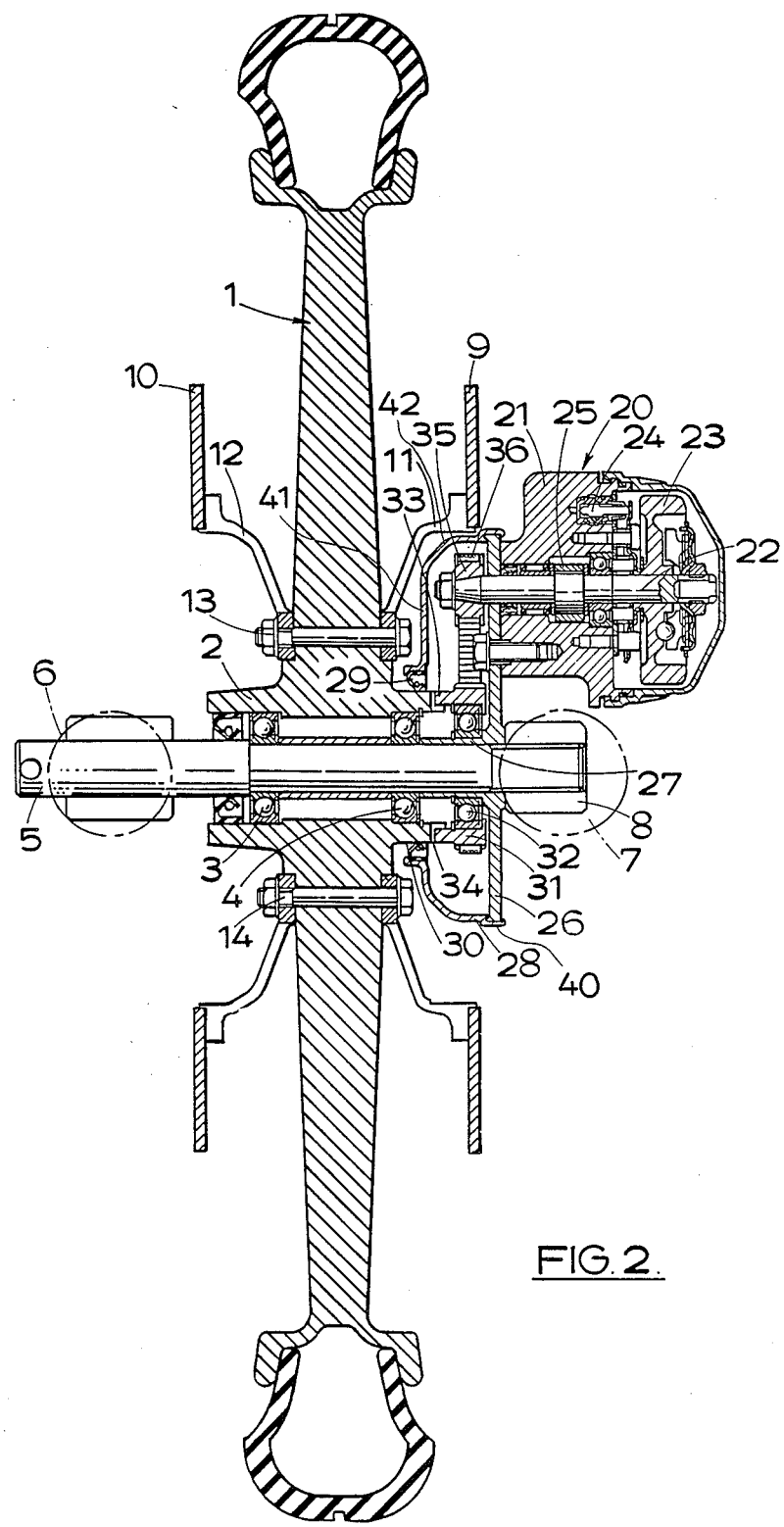
FIG. 2 is a section on the line 2—2 of FIG. 1.

The portion of the motor cycle illustrated in FIGS. 1 and 2 of the accompanying drawings shows a front wheel 1 having a hub 2 journalled for rotation on spaced bearings 3, 4 which are mounted on a stationary axle 5. Opposite ends of the axle 5 are received in the lower ends of the front forks 6, 7 of the motor cycle and the axle 5 is secured in position by means of a nut 8 at one end. Release of the nut 8 then enables the wheel 5 to be dropped down out of the forks.

A pair of annular brake discs 9, 10 are mounted on opposite sides of the wheel 1. A illustrated each disc 9, 10 is carried from its inner peripheral edge by a respective imperforate mounting flange 11, 12 generally of bell-shaped outline. The inner edges of the flanges 11, 12 are clamped against opposite faces of the wheel 1 by at least two nut and bolt clamp assemblies 13, 14.

A modulator unit 20 of known construction is mounted adjacent to the fork 7. The unit 20 comprises a housing 21 in which a drive shaft 22 is journalled for rotation. The drive shaft 22 drives a wheel angular speed sensor 23 of the flywheel type and an hydraulic pump 25. The sensor 23 operates a dump valve 24 for controlling the supply of fluid from a master cylinder to a brake, and dumping it to a reservoir for fluid to correct a wheel lock, and the pump 25 is operative to re-apply the brake automatically in a common braking cycle, after the wheel lock has been corrected.

The housing 21 is bolted to a circular mounting plate 26 with the drive shaft 22 parallel to the axle 5 and with the housing 21 projecting outwardly beyond the fork 7. The plate 26 has an eccentrically arranged boss 27 which encircles the adjacent end of the axle 5 and at its inner end is clamped against the bearing 4 by the nut 8.

The outer peripheral edge of the plate 26 is received within a casing 28 of generally bell-shaped outline, of which the inner peripheral edge carries an annular seal 29 in which a complementary face 30 on the hub 2 is rotatable. As illustrated in the drawings the casing 28 comprises a single imperforate member comprising a first end portion 40 extending axially inwards from the outer peripheral edge of the plate 26 towards the wheel 1, a second end portion 41 extending radially outwards from the external surface of the hub 2 in a direction spaced from and substantially parallel with the plate 26, and a third connecting portion 42 contiguous with the first end portion 40 and with the second end portion 41.

A drive pinion 31 is journalled for rotation on a bearing 32 mounted on the boss 27, and the pinion 31 is driven from the adjacent end of the hub 2 by the engagement of complementary dogs 33, 34 in the two components.

The outer end of the drive shaft 22 of the unit 20 extends into a recess defined between the plate 26 and the casing 28 and carries a driven pinion 35. The pinion 35, and in consequence the unit 20, is driven from the wheel 1 through the drive pinion 31 through a toothed endless belt 36 which encircles both pinions 31 and 35.

The pinions 31 and 35 and the belt 36 are enclosed within the casing 28 and are therefore protected from dirt and similar material.

The wheel 1 is a standard component but which requires a slight modification to provide the face 30 for the seal 29 and the drive dogs 34.

The modulator unit 20, the mounting plate 26, the pinions 31 and 35, the belt 36, and the casing 28 constitute an assembly which can be mounted on the wheel 1 simply by sliding the boss 27 onto the axle 5 to cause the dogs 33 and 34 to engage. The assembly is then clamped in position by screwing the nut 8 onto the end of the axle, in turn to clamp the boss 27 against the bearing 4.

The assembly can be easily removed from the motor cycle, for maintenance or replacement, by the reverse procedure of simply removing the nut 8 which enables the assembly then to be withdrawn from the axle.

Mounting the pinions on a common plate 26 has the advantage that the correct tension is maintained in the belt 36 when the plate 26 and the unit 20 are removed as a single assembly, for example upon removal of the wheel 5.

Figure 3:
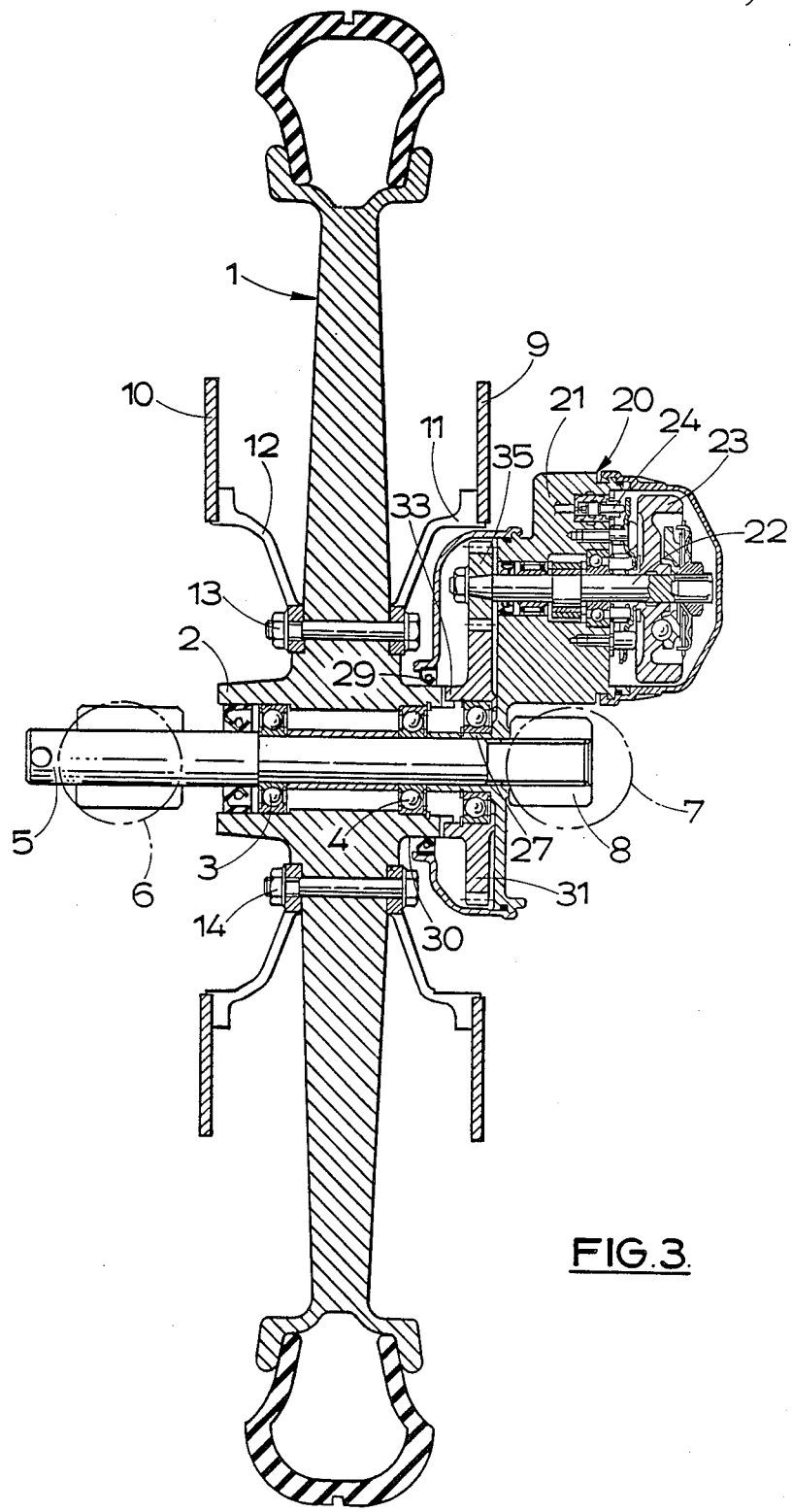
FIG. 3 is a view similar to FIG. 2 but showing a modification.

In the modified construction illustrated in FIG. 3 of the drawings the mounting plate 26 and the housing 21 are formed integrally as a single component. The belt 36 is omitted, and the diameters of the pinion 31 and 35 are increased and so that the pinions 31 and 35 are adapted for direct meshing engagement with each other.

The construction, operation, and installation of the unit shown in FIG. 3 is otherwise the same as that of FIGS. 1 and 2, and corresponding reference numerals have been applied to corresponding parts.

I claim:

1. In a motor cycle having a non-rotatable axle having opposite ends, a wheel having a hub, an external surface on said hub, means journalling said hub for rotation on said axle, an assembly comprising a brake pressure modulator unit, means for driving said unit from said wheel, a non-rotatable installation plate for installing said assembly on said axle said installation plate having means for mounting said plate on one of said ends of said axle and having an outer peripheral edge, means for mounting said unit on said plate, a non-rotatable casing secured to said assembly, said casing comprising a single imperforate member encircling said axle and enclosing said drive means, said member comprising a first end portion extending axially inwards from said outer peripheral edge of said plate towards said wheel and having an inner end and an outer end, a second end portion extending radially outwards from said external surface of said hub in a direction spaced from and substantially parallel with said plate, said second portion having an inner edge encircling said external surface of said hub and an outer end, and a third connecting portion contiguous with said first portion and said second portion and integral with said inner end of said first portion and said outer end of said second portion, means connecting said outer end of said first portion to said plate, and a sealing means providing a seal between said inner edge of said second portion and said external surface of said hub.

2. An assembly for a motor cycle as claimed in claim 1, wherein said sealing means comprises an annular seal, and said annular seal is carried by said inner edge of said second portion.

3. An assembly for a motor cycle as claimed in claim 1, wherein said hub has drive means, and a drive pinion has drive means for co-operation with said drive means on said hub, said drive means on said hub driving said drive pinion and wherein said plate has an axially extending boss which encircles said axle and provides a mounting for said drive pinion.

4. An assembly for a motor cycle as claimed in claim 3, wherein a bearing is mounted on said boss and said drive pinion is rotatable on said bearing.

5. An assembly for a motor cycle as claimed in claim 3, wherein a driven pinion is mounted on a drive shaft for said unit, and said drive pinion is adapted to drive said modulator unit, a belt drive co-operating with said drive pinion and said driven pinion.

6. Installation means as claimed in claim 3, wherein a driven pinion is mounted on a drive shaft for said modulator unit, and said drive pinion and said driven pinion are in direct co-operation.

7. An assembly for a motor cycle as claimed in claim 3, wherein said axle has a, bearing and wherein said assembly is removably mounted on said wheel, said boss being slidable onto said axle to an engaged position said drive means on said pinion being engaged with said drive means on said hub when said boss is in said mounted position, a detachable means co-operating with said axle to clamp said boss against said bearing on said axle in said mounted position.

8. An assembly for motor cycle as claimed in claim 7, wherein said detachable means comprises a nut which is screwed onto said axle.

9. In combination: a motor cycle front wheel assembly comprising a non-rotatable axle, spaced bearings on said axle, a front wheel having a hub journalled for rotation on said bearings, an external surface on said hub, a brake-pressure modulator unit, means for driving said unit from said wheel, a non-rotatable installation plate carrying said unit and for mounting on said axle, said installation plate having an outer peripheral edge, a non-rotatable casing comprising a single imperforate member encircling said axle and enclosing said drive means, said member comprising a first end portion extending axially inwards from said outer peripheral edge of said plate towards said wheel and having an inner end and an outer end, a second end portion extending radially outwards from said external surface of said hub in a direction spaced from and substantially parallel with said plate, said second portion having an inner edge encircling said external surface of said hub, and outer end, and a third connecting portion contiguous with said first portion and said second portion and integral with said inner end of said first portion and said outer end of said second portion, means connecting said outer end of said first portion to said plate a sealing means providing a seal between said inner edge of said second portion and said external surface of said hub.

* * * * *